(12) United States Patent
Ouchi et al.

(10) Patent No.: US 12,383,831 B2
(45) Date of Patent: Aug. 12, 2025

(54) PROGRAM, METHOD, ELECTRONIC DEVICE, AND SYSTEM FOR GAME INVOLVING MULTI-BATTLE

(71) Applicant: CYGAMES, INC., Tokyo (JP)

(72) Inventors: Iori Ouchi, Tokyo (JP); Miru Iwami, Tokyo (JP); Takafumi Sato, Tokyo (JP); Ryo Kitazawa, Tokyo (JP)

(73) Assignee: CYGAMES, INC., Tokyo (JP)

( * ) Notice: Subject to any disclaimer, the term of this patent is extended or adjusted under 35 U.S.C. 154(b) by 279 days.

(21) Appl. No.: 18/191,473

(22) Filed: Mar. 28, 2023

(65) Prior Publication Data

US 2023/0233939 A1    Jul. 27, 2023

Related U.S. Application Data

(63) Continuation of application No. PCT/JP2021/035493, filed on Sep. 28, 2021.

(30) Foreign Application Priority Data

Sep. 28, 2020   (JP) .................................. 2020-162395

(51) Int. Cl.
*A63F 13/537*    (2014.01)
*A63F 13/795*    (2014.01)
(Continued)

(52) U.S. Cl.
CPC .......... *A63F 13/537* (2014.09); *A63F 13/795* (2014.09); *A63F 13/822* (2014.09); *A63F 13/847* (2014.09)

(58) Field of Classification Search
CPC .... A63F 13/537; A63F 13/795; A63F 13/822; A63F 13/847; A63F 13/48; A63F 13/58
(Continued)

(56) References Cited

U.S. PATENT DOCUMENTS 8,984,080 B1 * 3/2015 Curtis ................... H04L 51/046
                                                           709/227
2014/0075305 A1 * 3/2014 Kaihu ................. G07F 17/3274
                                                           715/706

FOREIGN PATENT DOCUMENTS

| CN | 1915469 A | * | 2/2007 | ........... A47C 31/008 |
| JP | 2013202218 | * | 10/2013 | |
| JP | 2019/193890 A | | 11/2019 | |

OTHER PUBLICATIONS

Office Action issued in counterpart Japanese Patent Application No. 2020-162395 mailed on Feb. 17, 2021 (8 pages).
(Continued)

*Primary Examiner* — Michael A Cuff
(74) *Attorney, Agent, or Firm* — Osha Bergman Watanabe & Burton LLP

(57) ABSTRACT

Provided is a program, etc. for further encouraging a player to play a game. Provided is a program for a game including a multi-battle in which a plurality of players combat against a common enemy character, said program causing a computer to execute: a step of accepting a multi-battle initiation input from a player; a step of initiating a multi-battle for combating against a predetermined enemy character on the basis of the accepted multi-battle initiation input; a step of accepting a participation request input from the player, said participation request input requesting another player to participate in the initiated multi-battle; and a step of executing a process for inflicting damage on the enemy character upon accepting the participation request input.

9 Claims, 10 Drawing Sheets

(51) Int. Cl.
    *A63F 13/822*     (2014.01)
    *A63F 13/847*     (2014.01)

(58) Field of Classification Search
    USPC .......................................................... 463/31
    See application file for complete search history.

(56) References Cited

OTHER PUBLICATIONS

International Search Report issued in corresponding International Application No. PCT/JP2021/035493, mailed on Dec. 7, 2021 (6 pages).

[The Structure of a Multi-Battle] To beginners, the through decription, the Capture Guide of [Online], Retrieved from Internet on Sep. 21, 2020; Retrieved from Internet: URL: https://web.archive.org/web/202009211040500/ https://gurabulu-kouryaku.com/520.html (25 pages).

The[Online] castle and dragon, The character information MEMO wiki, Retrieved from Internet on Aug. 16, 2020; Retrieved from Internet: URL: https://seesaawiki.jp/castle_and_dragon/d/%CB%C9%B1%D2%BA%EE%C0% EF (9 pages).

The Tips collection I want the mel strike beginners to know, Retrieved from Internet on Nov. 28, 2019; Retrieved from Internet: URL: https://web.archive.org/web/20191128082827/]/yugalab.net/archives/9196 (16 pages).

\* cited by examiner

FIG.2
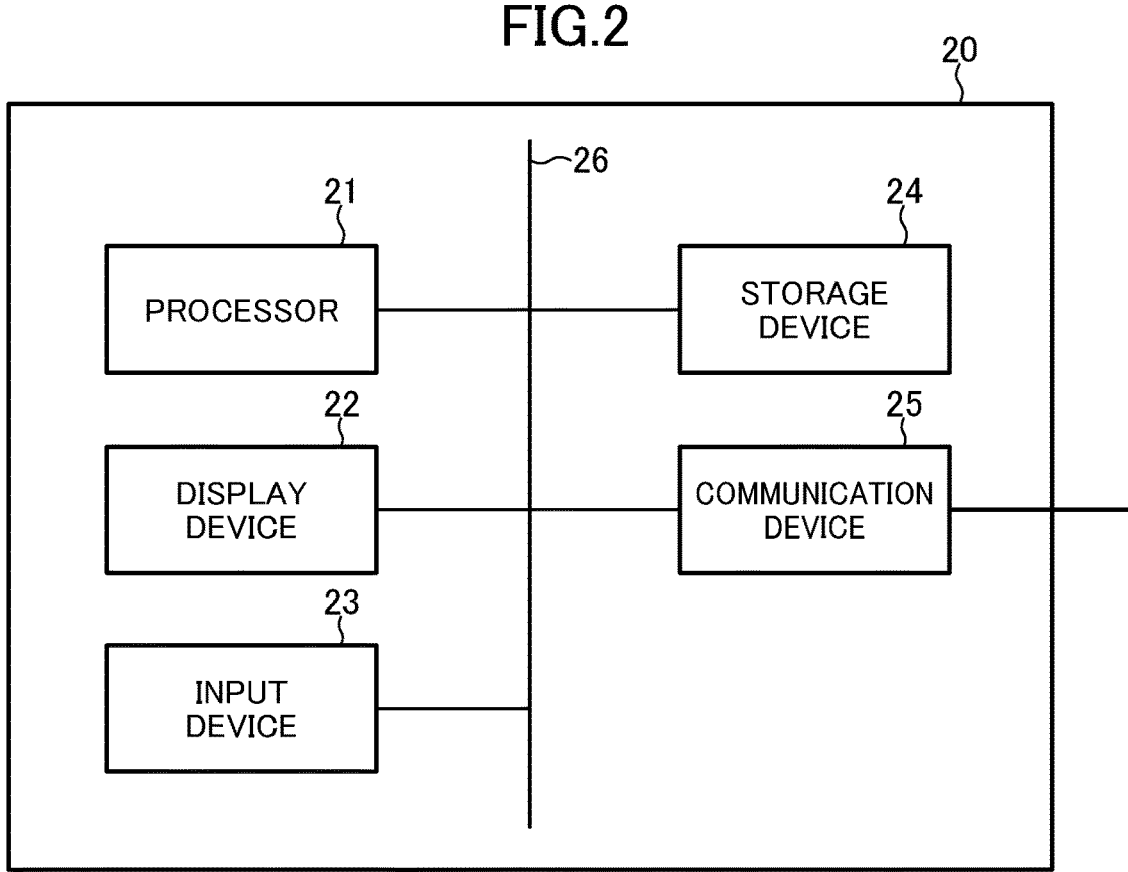
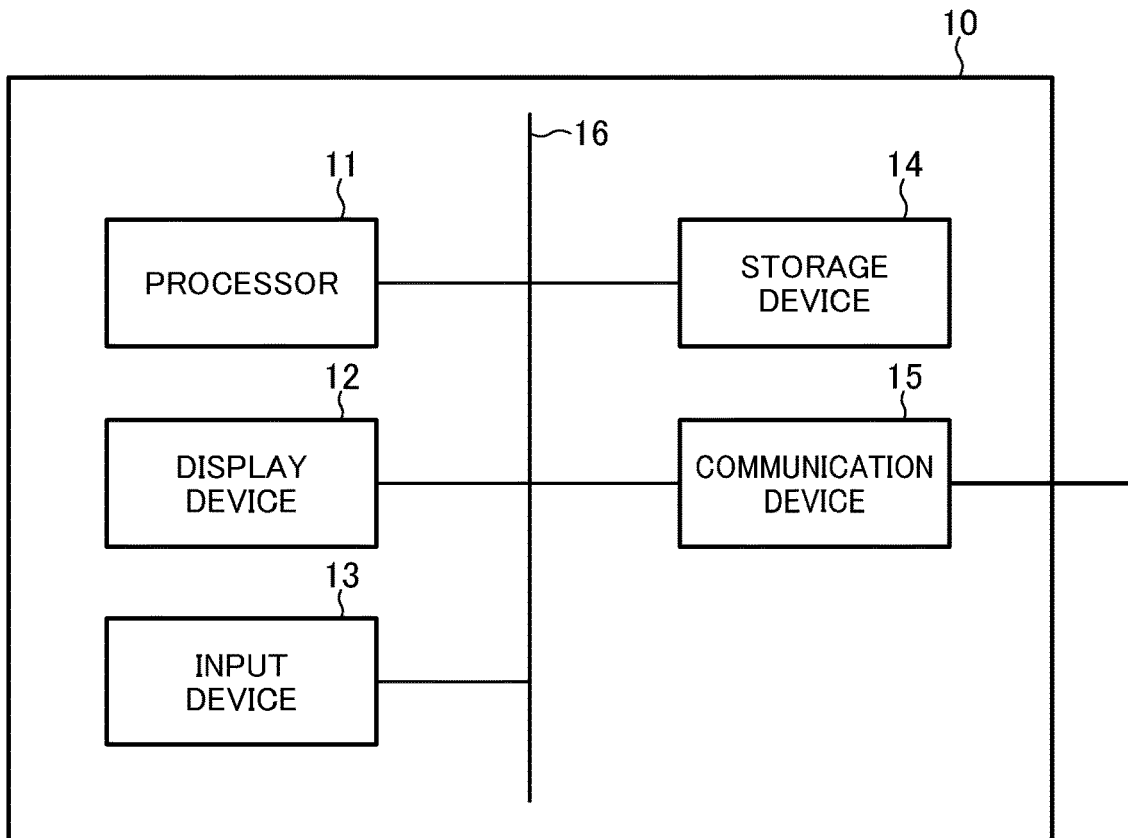

PROGRAM, METHOD, ELECTRONIC DEVICE, AND SYSTEM FOR GAME INVOLVING MULTI-BATTLE

TECHNICAL FIELD

The present invention relates to programs, etc. for games including a multi-battle, and in particular to programs, etc. for encouraging players to play games.

BACKGROUND ART

With the spread of online games, etc. in recent years, games in which multiple players fight a battle against a common enemy character have been released. In such games, there is a well-known system in which a player who initiates a battle against an enemy character requests another player to participate in the battle, and after the other player participates in the battle, a support effect is produced to enhance the status of the player under certain conditions (PTL 1).

CITATION LIST

Patent Literature

{PTL 1}
Japanese Unexamined Patent Application, Publication No. 2019-193890

SUMMARY OF INVENTION

Technical Problem

However, if the fighting strength of the player is low, there is a risk that he/she is not able to win a battle with an enhancement in status only. Moreover, even if a participation request is issued, it is not guaranteed that another player will participate in the battle, and even if another player does, it is not guaranteed that he/she will participate in the battle immediately. Therefore, the player may have difficulty winning a battle and thus become discouraged from playing the game.

The present invention has been conceived in order to solve such a problem, and a main object thereof is to provide a program, etc. to increase a player's motivation to play the game.

Solution to Problem

In order to achieve the above-described object, a program according to an aspect of the present invention is a program for a game including a multi-battle in which a plurality of players combat against a common enemy character, said program causing a computer to execute: a step of accepting a multi-battle initiation input from a player; a step of initiating a multi-battle for combating against a predetermined enemy character on the basis of the accepted multi-battle initiation input; a step of accepting a participation request input from the player, said participation request input requesting another player to participate in the initiated multi-battle; and a step of executing a process for inflicting damage on the enemy character upon accepting the participation request input.

In the above-described game, a player may possess at least one character and combat against the enemy character by using the possessed character, and the step of executing a process for inflicting damage may include a step of displaying a presentation for rendering the infliction of damage on the enemy character by means of a presentation character selected from among predetermined characters, regardless of whether or not the presentation character is possessed by the player.

The step of executing a process for inflicting damage can include a step of selecting the presentation character from among characters selected in advance by another player.

The step of executing a process for inflicting damage on the enemy character may include: a step of executing a lottery process for determining whether or not to inflict damage on the enemy character; and a step of inflicting damage on the enemy character when it is determined that damage is inflicted on the enemy character as a result of the lottery process.

In addition, in the lottery process, a probability for determining that damage is inflicted on the enemy character may be determined on the basis of a parameter assigned to the enemy character.

The damage can have a value equal to or larger than the remaining hit points of the enemy character, and the process for requesting another player to participate in the multi-battle can be prevented from being executed on the basis of the participation request input.

The damage can have a value smaller than the remaining hit points of the enemy character, and the process for requesting another player to participate in the multi-battle can be executed on the basis of the participation request input.

A method according to an aspect of the present invention is a method for a game including a multi-battle in which a plurality of players combat against a common enemy character, said method including: a step of accepting a multi-battle initiation input from a player; a step of initiating a multi-battle for combating against a predetermined enemy character on the basis of the accepted multi-battle initiation input; a step of accepting a participation request input from the player, said participation request input requesting another player to participate in the initiated multi-battle; and a step of executing a process for inflicting damage on the enemy character upon accepting the participation request input.

An electronic device according to an embodiment of the present invention is an electronic device for a game including a multi-battle in which a plurality of players combat against a common enemy character, said electronic device including: a functional unit for accepting a multi-battle initiation input from a player; a functional unit for initiating a multi-battle for combating against a predetermined enemy character on the basis of the accepted multi-battle initiation input; a functional unit for accepting a participation request input from the player, said participation request input requesting another player to participate in the initiated multi-battle; and a functional unit for executing a process for inflicting damage on the enemy character upon accepting the participation request input.

A system according to an embodiment of the present invention is a system for a game including a multi-battle in which a plurality of players combat against a common enemy character, said system including: a server; and a player terminal of each of the players that is connected to the server, wherein the server accepts a multi-battle initiation input that is made by a player and that is transmitted from a player terminal, initiates a multi-battle for combating against a predetermined enemy character on the basis of the accepted multi-battle initiation input, accepts a participation request input that is made by the player and that is transmitted from the player terminal, said participation request input requesting another player to participate in the initiated multi-battle, executes a process for inflicting damage on the enemy character upon accepting the participation request input, and transmits, to the player terminal, presentation information for a presentation that renders the infliction of damage on the enemy character, and the player terminal accepts the multi-battle initiation input and the participation request input made by the player, transmits the inputs to the server, and displays a presentation on the basis of the presentation information from the server.

Advantageous Effects of Invention

The present invention can further encourage a player to play a game.

BRIEF DESCRIPTION OF DRAWINGS

FIG. 2 is a hardware configuration diagram of the system according to one embodiment of the present invention.

DESCRIPTION OF EMBODIMENTS

A game system 1 according to an embodiment of the present invention will now be described with reference to the drawings. In this description, there are cases where descriptions that are more detailed than necessary are omitted for convenience of explanation. For example, there are cases where detailed descriptions of matters that are already well known and repeated descriptions of substantially the same configurations are omitted.

Figure 1:
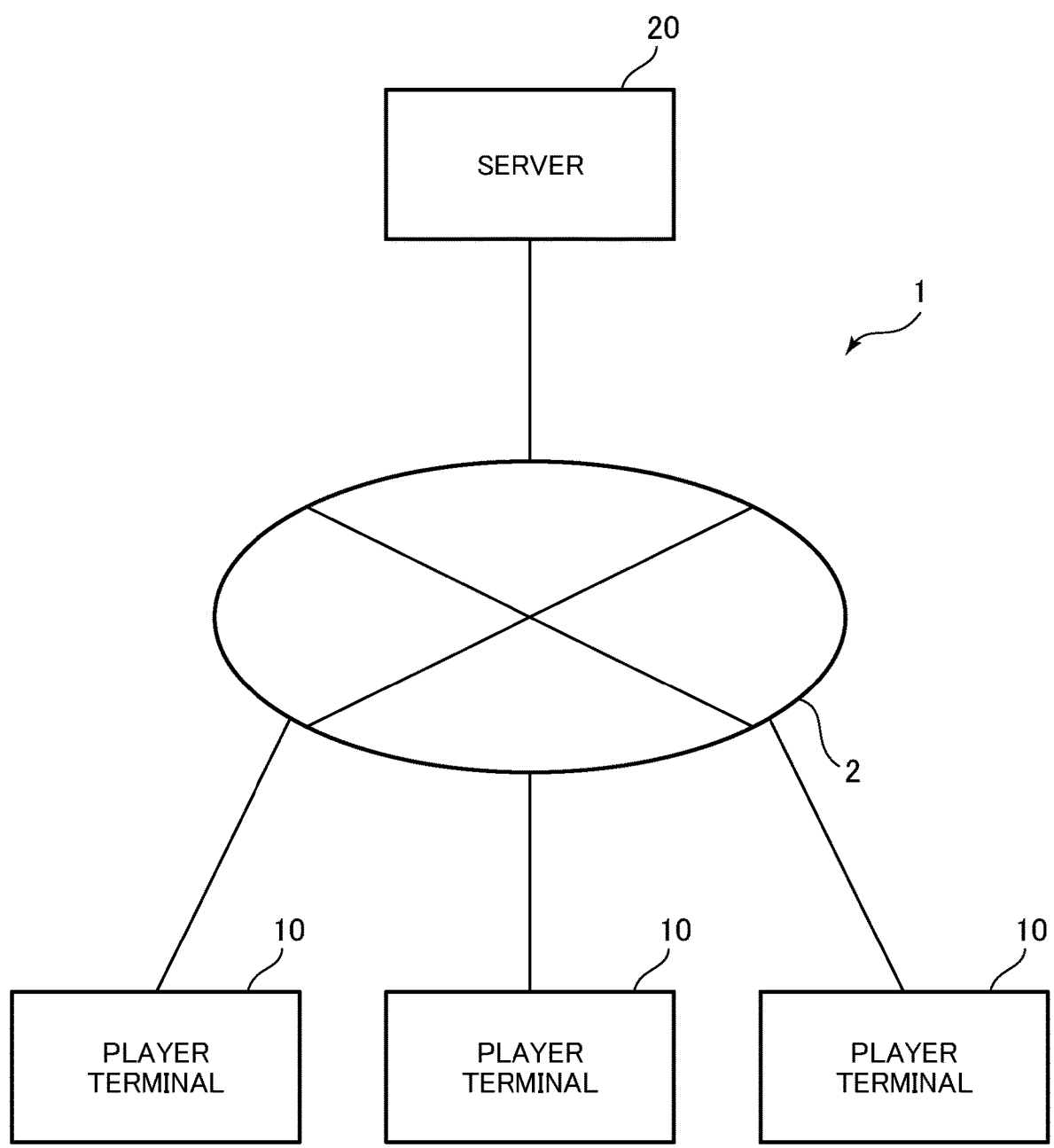
FIG. 1 is a configuration diagram of a system according to one embodiment of the present invention.

The game system 1 is assumed to be realized by a system in which a plurality of player terminals are connected to a server via a network. FIG. 1 shows an example of the overall structure of the game system 1 according to one embodiment of the present invention. As shown in FIG. 1, the game system 1 includes a plurality of player terminals 10 and a server 20, and the player terminals 10 and the server 20 are connected to a network 2, such as the Internet, so as to be capable of communicating with each other. Note that the game system 1 according to this embodiment is described assuming a server-client system.

The game system 1 according to this embodiment executes a battle in which a player's character combats against an enemy character. A single player alone may combat against an enemy character, or alternatively, a player may request another player to participate in the battle and combat against a common enemy character jointly with the other player who has participated in the battle in response to the participation request. Such a battle in which multiple players can jointly combat against a common enemy character is called a multi-battle.

FIG. 2 is a block diagram showing the hardware configurations of a player terminal 10 and the server 20 according to one embodiment of the present invention. The player terminal 10 includes a processor 11, a display device 12, an input device 13, a storage device 14, and a communication device 15. These constituent devices are connected via a bus 16. It is assumed that interfaces are interposed as needed between the bus 16 and the individual constituent devices. In this embodiment, the player terminal 10 is a smartphone. Alternatively, the player terminal 10 can be an electronic device, such as a tablet computer, a personal computer, and a game device, as long as the electronic device includes the configurations described above.

Similarly, the server 20 includes a processor 21, a display device 22, an input device 23, a storage device 24, and a communication device 25. These constituent devices are connected via a bus 26. It is assumed that interfaces are interposed as needed between the bus 26 and the individual constituent devices. In this embodiment, the server 20 is realized by a computer.

The processors 11 and 21 control the operation of the entire player terminal 10 and the entire server 20 and are, for example, a CPU. Note that an electronic circuit, such as an MPU, may be used as the processors 11 and 21. The processors 11 and 21 execute various types of processing by loading programs and data stored in the storage devices 14 and 24 and then executing the programs. In one example, the processors 11 and 21 are constituted of a plurality of processors.

The display devices (displays) 12 and 22 present the user of the player terminal 10 (player) and the user of the server 20 (administrator) with application screens, etc. under the control of the processors 11 and 21. For the display devices 12 and 22, a liquid crystal display is preferable. However, the display devices 12 and 22 may be realized by an organic EL display, a plasma display, or the like.

The input devices 13 and 23 are a user interface for accepting inputs to the player terminal 10 and server 20 from a user. The input devices 13 and 23 are, for example, a touchscreen, a touchpad, a keyboard, or a mouse. Because the player terminal 10 in this embodiment is a smartphone, the player terminal 10 includes, as the input device 13, a touchscreen, which also functions as the input device 12. That is, the display device 12 and the input device 13 are integrated. The input device 12 and the display device 13 may be discrete devices that are located at different positions. Because the server 20 is a computer, it is assumed that the server 20 includes a keyboard and a mouse as the input device and includes a liquid crystal display as the display device.

The storage devices 14 and 24 are a storage device provided in a general smartphone and computer, including a storage device using a RAM (volatile memory) or a flash memory (nonvolatile memory), such as an eMMC, a UFS, or an SSD, as well as a magnetic storage device. The storage devices 14 and 24 can also include an external memory. For example, the storage device 14 stores a browser program and a game program, and the storage device 24 stores a game program for the server. The browser program and game programs are started in response to a user operation on the player terminal 10 and are executed on the operating system (OS) pre-installed in the player terminal 10. The game program for the server includes a function for executing information processing so as to appropriately proceed with the game on the browser program and the game program executed in each of the player terminals serving as a client, as well as various types of data.

In one example, the storage devices 14 and 24 include a main storage device and an auxiliary storage device. The main storage device is a volatile storage medium capable of high-speed reading and writing of information and is used as a storage area and a work area when the processors 11 and 21 process information. The auxiliary storage device stores various types of programs, as well as data that are used by the processors 11 and 21 when the programs are executed. The auxiliary storage device is, for example, a hard disk device; however, the auxiliary storage device may be any type of nonvolatile storage or nonvolatile memory that is capable of storing information, and may be of the removable type. For example, the auxiliary storage device stores the operating system (OS), middleware, application programs, various types of data that may be referenced when these programs are executed, etc. In addition, a database physically separated from the player terminal 10 and the server 20 can also be used as the storage devices.

The communication devices 15 and 25 transmit data to and receive data from other computers via the network 2 (not shown in FIG. 2). For example, the communication devices 15 and 25 perform wireless communication, such as mobile communication or wireless LAN communication, to connect to the network 2. The player terminal 10 communicates with the server 20 via the network by using the communication device 15. Alternatively, the communication devices 15 and 25 may perform wired communication by using, for example, an Ethernet® cable.

Figure 3:
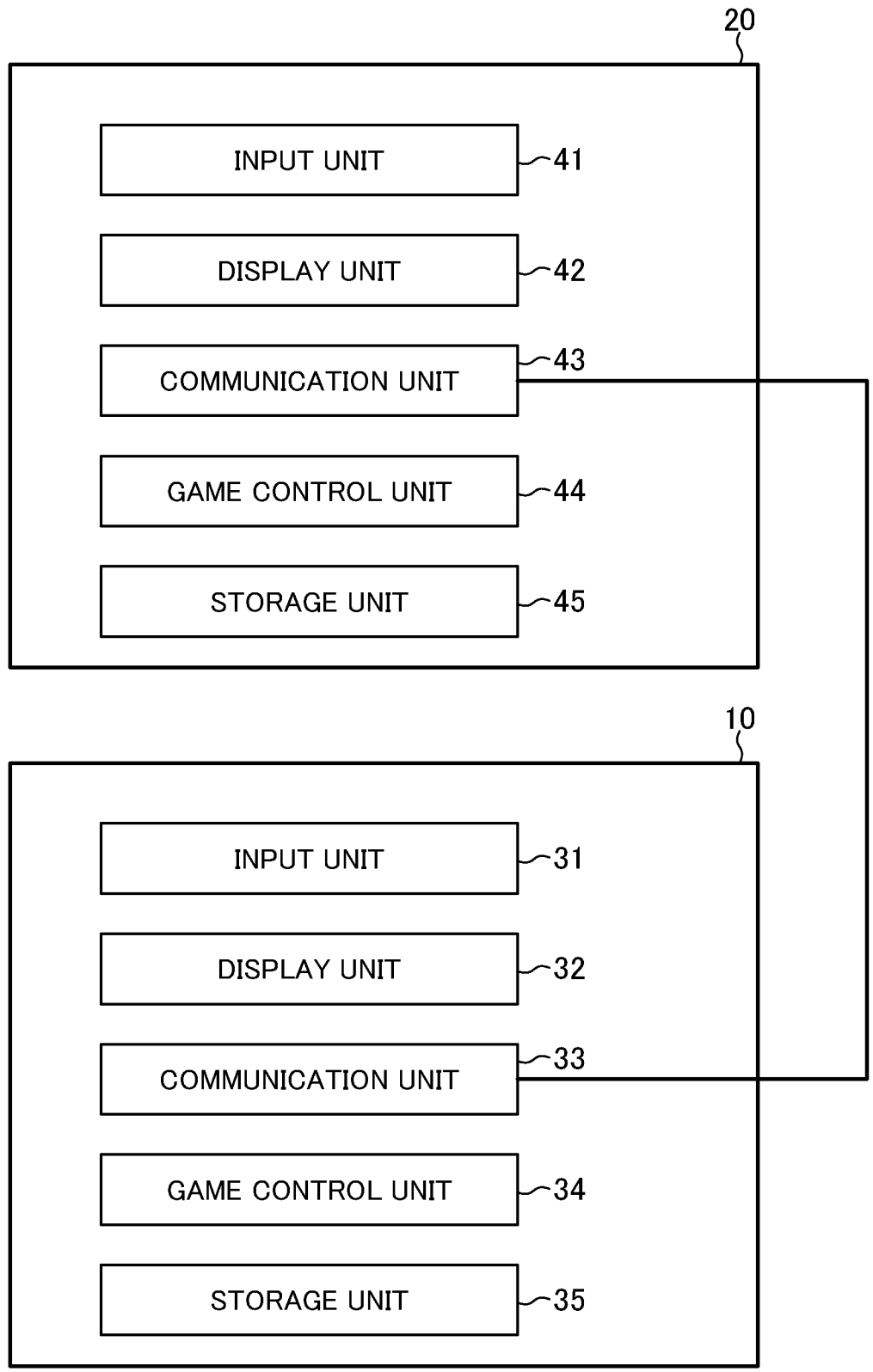
FIG. 3 is a functional block diagram of the system according to one embodiment of the present invention.

FIG. 3 shows an example of a functional block diagram of the player terminal 10 and the server 20 according to one embodiment of the present invention. The player terminal 10 includes: an input unit 31; a display unit 32; a communication unit 33; a game control unit 34; and a storage unit 35. The server 20 includes: an input unit 41; a display unit 42; a communication unit 43; a game control unit 44; and a storage unit 45. In this embodiment, these functions are realized as a result of the processors 11 and 21 executing programs. For example, the programs that are executed include the browser program and the game programs stored in the storage devices 14 and 24. Since various types of functions are realized by loading a program, as described above, a portion or the entirety of one part (function) may be provided in another part. These functions may be realized by means of hardware by configuring electronic circuits or the like for realizing the individual functions in part or in entirety.

The input units 31 and 41 are constituted using the input devices 13 and 23 and accept inputs to the player terminal 10 and the server 20 from the user. The player terminal 10 and the server 20 accept a user input by means of the input units 31 and 41. The user input may include a command input indicating, for example, a player command in the game. In this embodiment, the player terminal 10 can use a touch detection function that is commonly possessed by smartphones provided with touchscreens.

The display unit 32 of the player terminal 10 displays a game screen using the display device 12 and displays a game screen according to the game progress and a user operation. The display unit 42 of the server 20 displays a management screen for a game administrator on the display device 22, as required.

The game control units 34 and 44 perform control processing in executing the game of this embodiment and store, in the storage units 35 and 45, various types of data needed for processing. In this embodiment, the game control unit 34 of the player terminal 10 is realized by using the browser program and performs processing of input/output information to/from the user, processing of transmission/reception signals to/from the server 20, etc. The game control unit 34 may be realized as a result of the game application being installed in the player terminal 10.

The game control unit 44 of the server 20 is realized as a result of the game program for the server being executed and performs processing for the game executed in the player terminal 10. In an example, when the game control unit 34 is realized as a result of the browser being started in the player terminal 10 and the server 20 is accessed in order to proceed with the game, the game control unit 44 proceeds with the game by transmitting and receiving data periodically or as required. For example, the game control unit 44 performs control processing in executing the game of this embodiment, stores various types of necessary data, etc. in the storage unit 45, and provides the data to the player terminal 10, as appropriate.

The game control unit 44 executes a process associated with a command on the basis of a command input received via the communication unit 43. As command inputs, a participation request input (participation request command input) for requesting other players to participate in the battle and an attack input (attack command input) will be described. However, it would be obvious to those skilled in the art that the command inputs can also include other commands such as an ability utilization command.

The storage units 35 and 45 are constituted using the storage devices 14 and 24. The storage unit 45 of the server 20 stores parameters of players, parameters of enemy characters, battle parameters related to battles, etc. Parameters of a player include information such as the player ID, name, level, weapons possessed, characters possessed, items possessed, favorite characters, guilds belonged to, and player IDs of players serving as friends. Parameters related to a character possessed can include the character ID, name, level, attacking power, defending power, hit points, etc.

A guild is a group composed of a plurality of players, who enjoy chatting within the group, cooperate to defeat an enemy, and compete against other guilds for the total number of points earned by members in an event. Unlike a guild, friends of a player do not constitute a particular group but refer to other players having a predetermined cooperative relationship with the player. For example, a friend relationship is established by a mutual agreement between two players, who can cooperate with each other, such as lending and borrowing items in each player's possession.

The parameters of a player may include information concerning multi-battles in which the player can participate. For example, when one player inputs a participation request command for requesting other players to participate in a battle initiated by the player, the player can determine the other players to whom the participation request is sent as a result of a participation request process (described below) being executed, and furthermore, information for participating in the relevant multi-battle is stored as one of the parameters of each of the determined players (participation-requested players).

Parameters of an enemy character include, for example, the ID, name, level, attacking power, defending power, hit points, etc. of the enemy character. Battle parameters include parameters of the players participating in the battle and parameters of the enemy character. In this embodiment, when initiating a battle, a player selects four characters from a plurality of characters in his/her possession. Player parameters in the battle parameters are assumed to include information concerning these selected player characters. In addition, each parameter can change as the battle proceeds. For example, hit points can be reduced by an opponent's attack, and attacking power and defending power can be increased or reduced by special abilities. In addition, in the case where a plurality of players participate in a battle, the parameters of these participating players are stored in association with each other.

As described below, when accepting an attack input (attack input command) from a player, the server 20 executes a process for inflicting, on the enemy character, first damage determined based on the attacking ability value, etc. of a player character (S554). Furthermore, this embodiment assumes that when accepting a participation request input (participation request input command) and an attack input (attack input command) from a player, the server 20 executes a process for inflicting second damage different from the first damage on the enemy character (S518 and S548). Here, the second damage is damage the magnitude of which is determined on the basis of a predetermined probability, independently of the ability values of the player characters. Although this embodiment assumes that the first damage is ability-value-dependent damage and the second damage is ability-value-nondependent damage, the second damage may also be ability-value dependent.

Predetermined probabilities for ability-value-nondependent damage are determined in advance on the basis of the levels of the enemy character and are stored in the storage unit 45 of the server 20 in the form of damage-inflicting probability tables. Here, the damage-inflicting probability tables include a damage-inflicting probability table for participation request inputs and a damage-inflicting probability table for attack inputs. Ability-value-nondependent damage can be, for example, single-killing-hit damage that is, independently of the attacking power of the player characters, so deadly as to reach all hit points of the enemy character with a single hit or mega damage that is not so deadly as to reach the remaining hit points of the enemy character but is as enormous as to exceed 80% of all HPs of the enemy character or is as enormous as one-million damage. Unlike normal ability-value-dependent inflicting damage, ability-value-nondependent damage may be determined not on the basis of the defending power of the enemy character. Examples of the damage-inflicting probability tables are shown in Table 1 and Table 2.

TABLE 1

(Damage-inflicting probability table for participation request inputs)

| Enemy character level | Damage-inflicting probability |
|---|---|
| 40 | 20.0% |
| 60 | 20.0% |
| 70 | 15.0% |
| 90 | 10.0% |

TABLE 2

(Damage-inflicting probability table for attack inputs)

| Enemy level character | Damage-inflicting probability | | | |
|---|---|---|---|---|
| | 0-4 turns | 5-9 turns | 10-14 turns | 20 turns and more |
| 40 | 1.0% | 1.5% | 2.0% | 3.0% |
| 60 | 1.0% | 1.5% | 2.0% | 3.0% |
| 70 | 0.5% | 0.8% | 1.0% | 1.2% |
| 90 | 0.5% | 0.8% | 1.0% | 1.2% |

Table 1 shows a damage-inflicting probability table for participation request inputs. Probabilities of inflicting ability-value-nondependent damage on the enemy character when the server 20 accepts a participation request input are determined in advance according to the levels of the enemy character. For example, when accepting a participation request input in the case where the level of the enemy character is 40, the server 20 inflicts damage on the enemy character at a probability of 20.0%.

Table 2 shows a damage-inflicting probability table for attack inputs. Probabilities of inflicting ability-value-nondependent damage on the enemy character when the server 20 accepts an attack input are determined in advance according to the levels of the enemy character and the elapsed turns. For example, when an attack input is made in an elapsed turn of 0 to 4 in the case where the level of the enemy character is 40, the server 20 inflicts damage on the enemy character at a probability of 1.0%. If the enemy character survives after ability-value-nondependent damage has been inflicted at a predetermined probability in response to an attack input, it is possible to inflict ability-value-dependent damage based on a normal attack input.

This embodiment assumes that: a turn-based battle in which the player characters and the enemy character alternately attack each other is employed; and a damage-inflicting probability is determined according to the elapsed turn. However, it is also possible to determine a damage-inflicting probability independently of the elapsed turn in a game other than turn-based battles, such as a battle in which both player characters and the enemy character simultaneously attack each other. Damage-inflicting probabilities may be determined according to the elapsed time.

Next, information processing executed in the game system 1 according to an embodiment of the present invention will be described using the flowchart shown in FIG. 4. The game system in this embodiment is a system for a game that allows a plurality of players to fight a battle against a common enemy character. Although a battle against the enemy character is assumed to be initiated in response to a multi-battle initiation input made by one player, a battle may be initiated by a plurality of players in cooperation with each other. The relevant player may defeat the enemy character by himself/herself. The relevant player may send a participation request to other players and defeat the common enemy character in cooperation with the other players who have participated in the multi-battle with a response to the participation request.

The player terminal 10 of each of the players is connected to the server 20, and the players participating in the battle attack the common enemy. The players win the battle when the HPs of the common enemy character become zero, and the enemy character wins the battle when the HPs of the player characters of all participating players become zero.

Figure 4:
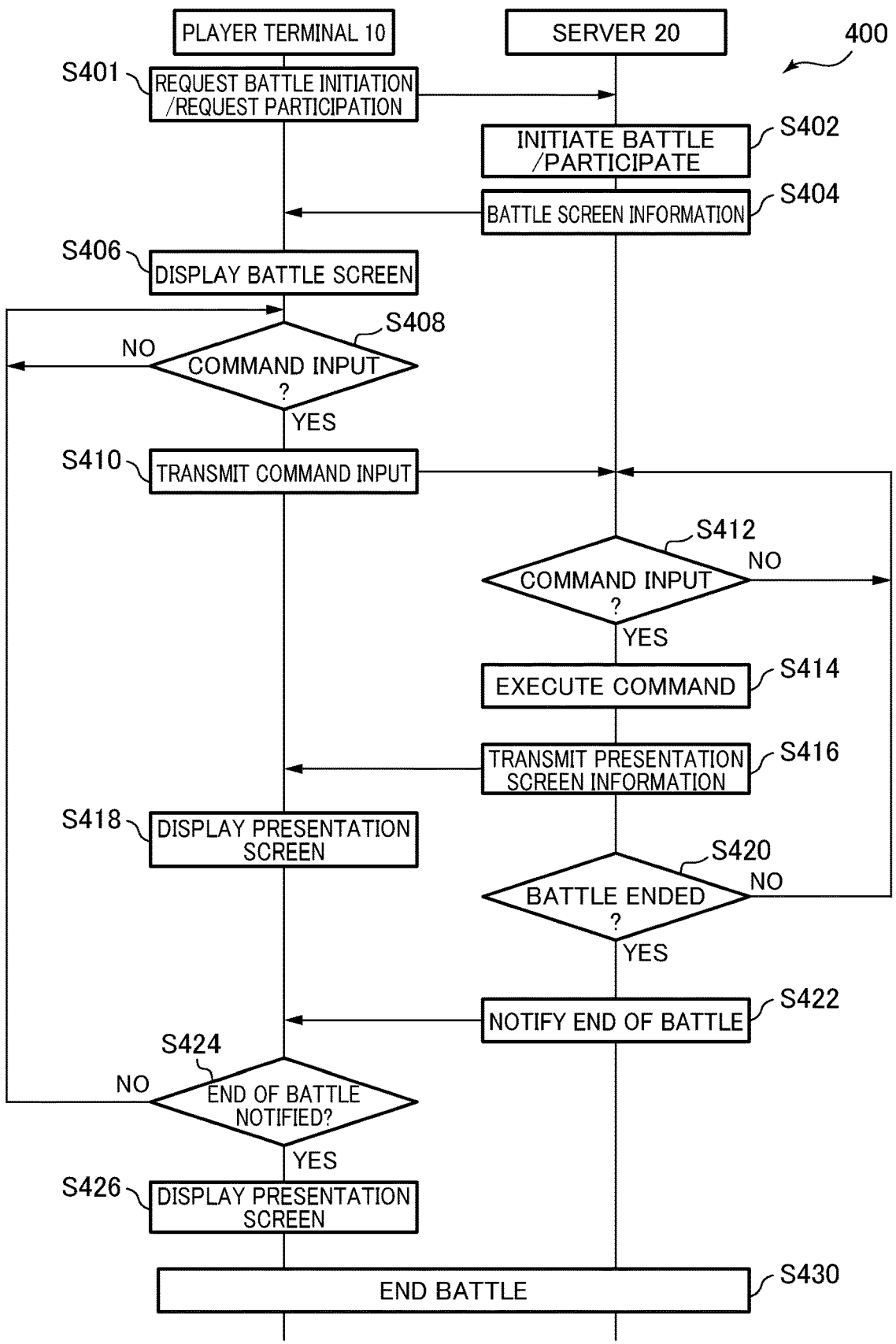
FIG. 4 is a flowchart showing information processing according to one embodiment of the present invention.

The flowchart in FIG. 4 shows information processing executed between the server 20 and one player terminal 10. The same information processing can be concurrently and independently executed on the player terminals 10 of all players participating in the battle. Processing executed concurrently can be associated with, for example, respective player IDs. It should be noted, however, that a battle initiation request (S401) and a battle initiation process (S402) are processes executed in relation to the player terminal 10 that initiates a battle, and a participation request (S401) and a participation start process (S402) are executed instead in relation to a player terminal 10 that participates in the battle in response to a participation request. A player in relation to the flowchart in FIG. 4 refers to the player of a player terminal 10 executing the information processing in the flowchart, and a player character in relation to the flowchart in FIG. 4 refers to a player character that is associated with the player ID of that player and that is selected for the battle.

First, a player transmits a battle initiation request to the server 20 by making an operation input via the player terminal 10 (S401). Upon receiving the battle initiation request, the server 20 generates battle parameters on the basis of the player ID (PID) included in the battle initiation request, stores the battle parameters in the storage unit 45, and initiates a battle (S402).

Next, the server 20 generates battle screen information corresponding to the PID and transmits the generated battle screen information to the player terminal 10 associated with the relevant PID (S404). Here, the server 20 is assumed to generate screen information including an image of the enemy character and images of the player characters associated with the relevant PID.

Upon receiving the battle screen information, the player terminal 10 displays a battle screen including command input buttons on the display unit 32 (S406). Then, the player terminal 10 waits for a command input from the player (S408), and when the input unit 31 accepts a command input from the player, the player terminal 10 transmits the command input to the server 20 via the communication unit 33 (S410).

Figure 7:
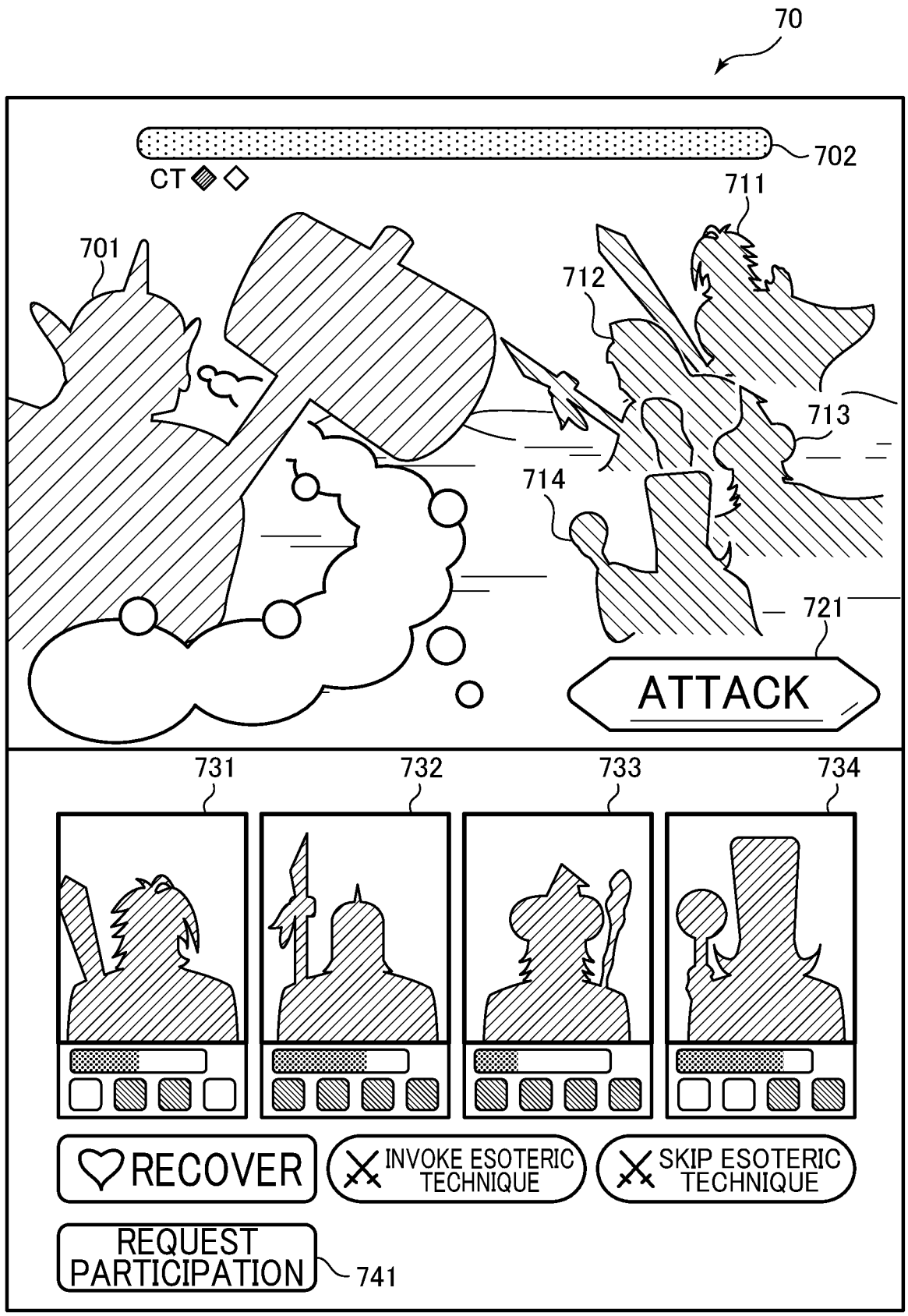
FIG. 7 is an example of a game screen according to one embodiment of the present invention.

FIG. 7 shows an example of the battle screen. The battle screen includes an enemy character image 701, remaining HPs (%) 702 of the enemy character, player character images 711 to 714, an attack button 721, player character images 731 to 734 with which player characters may be specified, and a participation request button 741.

Upon detecting the player touching the attack button 721 or the participation request button 741, the input unit 31 of the player terminal 10 accepts a command input (attack input or participation request input) for instructing the execution of the attack command or the participation request command, which is then transmitted to the server 20 via the communication unit 33 (S410). In addition, when one of the player character images 731 to 734 is touched, an ability button for executing an ability specific to the character may be further displayed, so that when the player touches the ability button, the player terminal 10 can accept the touch as a command input for instructing the execution of the ability and transmit the command input to the server 20.

When the server 20 waiting for a command input (attack input or participation request input) from the player terminal 10 (S412) accepts a command input, the server 20 executes the command specified with the relevant command input (S414) and transmits, to the player terminal 10, presentation screen information (presentation information) generated by executing the command (S416). Upon receiving the presentation screen information, the player terminal 10 displays, on the display unit 32, a presentation screen on the basis of the presentation screen information (S418). The presentation is not limited to a screen display presentation but may be a presentation made with audio alone or a presentation including a screen and audio.

The server 20 determines whether or not the battle has ended as a result of the execution of a command (S414) (S420). The server 20 determines whether or not the remaining HPs of the enemy character have reached zero and whether or not the remaining HPs of the player characters have reached zero as a result of the execution of a command and assumes that the battle has ended when the HPs of either the enemy character or the player characters have reached zero. In the case where the battle has not ended, the server 20 returns to wait for a command input (S412) and repeats the above-described processing until it is determined that the battle has ended.

When it is determined that the battle has ended, a battle end notification including the results of the battle and presentation screen information is transmitted from the server 20 to the player terminal 10 (S422). The player terminal 10 waits for a battle end notification (S424), and upon receiving a battle end notification, the player terminal 10 not only displays, on the display unit 32, a presentation screen on the basis of the results of the battle and the presentation screen information but also displays the results of the battle for the player (S426), thus ending the battle (S430). In the case where the player terminal 10 does not accept a battle end notification, the player terminal 10 returns to wait for a command input (S408) and repeats the above-described processing until accepting a battle end notification.

Figure 5:
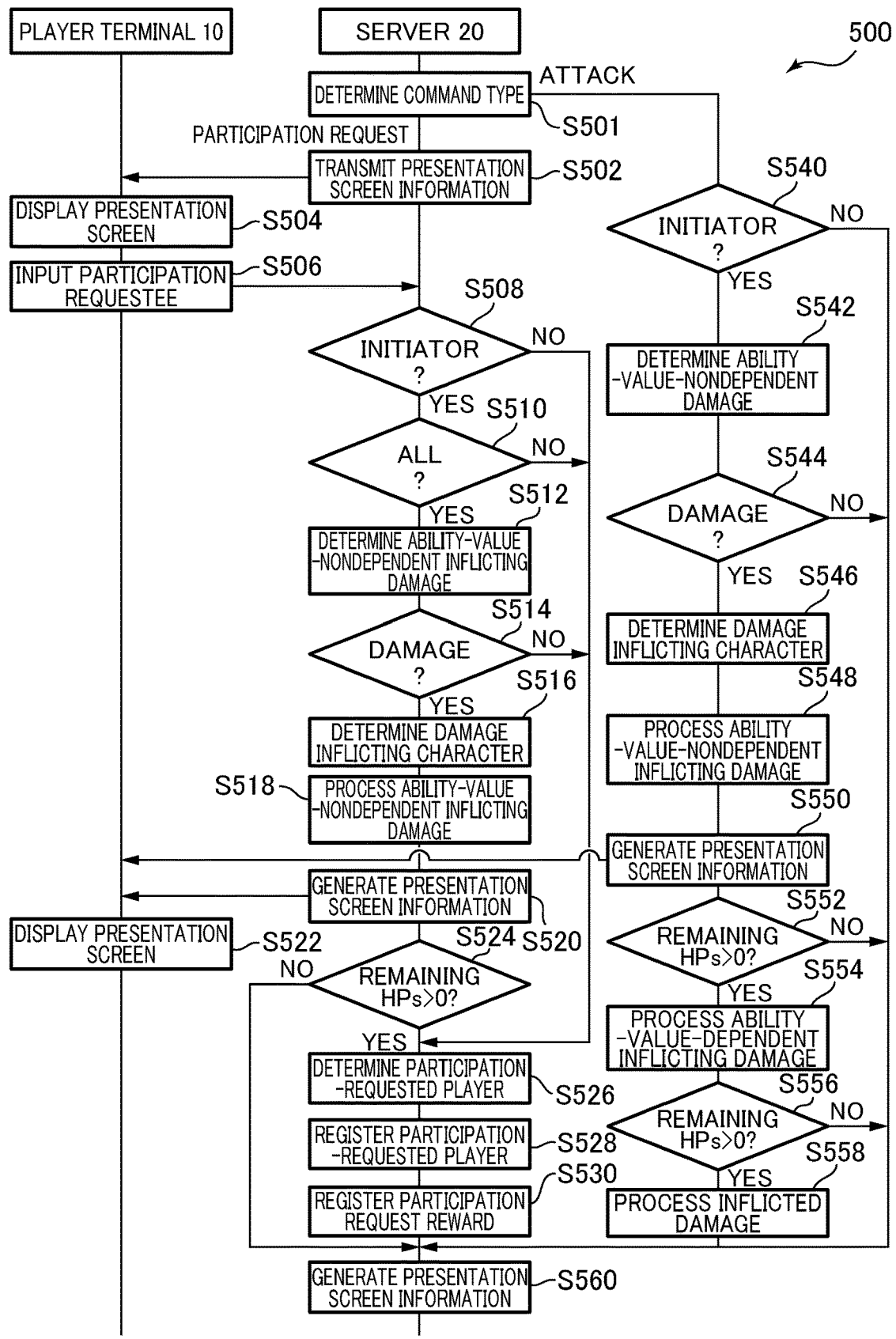
FIG. 5 is a flowchart showing information processing according to one embodiment of the present invention.

Next, processing for the execution of a command (S414) will be described in more detail on the basis of the flowchart shown in FIG. 5. Upon accepting a command input from the player terminal 10, the server 20 determines the type of the relevant command input (S501). Although this embodiment assumes that there are two types of command inputs including the attack command input realized by touching the attack button 721 and the participation request command input realized by touching the participation request button 741, it is also acceptable to provide only one of the two types and further to provide another type of command input.

In the case where the command input is a participation request command input, the server 20 generates information for displaying a presentation screen that allows the player to specify recipients to whom a participation request is sent and transmits the information to the player terminal 10 (S502). Upon receiving the presentation screen information, the player terminal 10 displays, on the basis of this presentation screen information, a presentation screen for specifying a participation requestee (S504), and upon accepting a participation requestee input made by the player, the player terminal 10 transmits the participation requestee input to the server 20.

Figure 8:
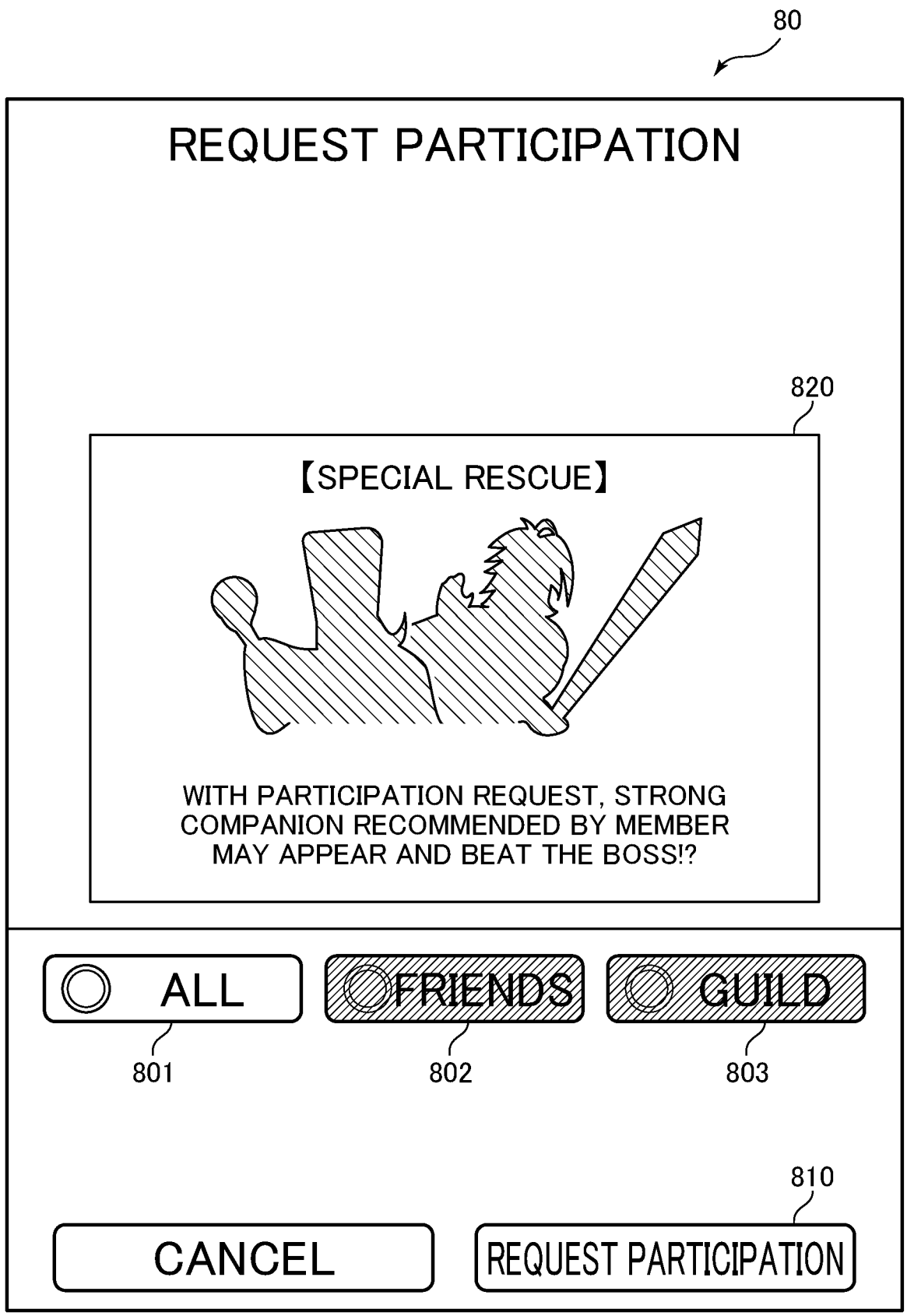
FIG. 8 is an example of a game screen according to one embodiment of the present invention.

FIG. 8 shows an example of the presentation screen for specifying recipients to whom a participation request is sent. In this embodiment, an "all" button 801 for transmitting a participation request to all players, a "friend" button 802 for transmitting a participation request to the friends of the player, and a "guild" button 803 for transmitting a participation request to the members of the guild are displayed in order to allow the player to specify other players serving as the recipients to whom a participation request is sent. When the "all" button 801 is touched by the player, the participation request is sent to a predetermined number of players randomly selected from all players. When at least one of the buttons 801 to 803 is touched and a participation request button 810 is then touched, a participation requestee input is transmitted to the server 20. In addition, a participation request can also be made by generating an identifier for identifying the battle and then publicizing the relevant identifier via a social networking service, etc. When another player who has viewed this identifier inputs the identifier on a predetermined screen, the other player can participate in the relevant battle.

This embodiment assumes that in the case where a participation request input is made for "all", an ability-value-nondependent damage-inflicting process can be executed. In the case where the "all" button 801 is touched and turned on, the presentation screen is assumed to display information, as shown in FIG. 8, indicating that ability-value-nondependent damage could be inflicted as a "special rescue" (820). In another embodiment, an ability-value-nondependent damage-inflicting process may be executed in the case where an input of a participation request other than a participation request for "all" is made, or alternatively, an ability-value-nondependent damage-inflicting process may be executed in the case where a participation request input is made for at least one of "all", "friend", and "guild". Moreover, another embodiment may be configured so as to allow selection of only one or two of "all", "friend", and "guild" as destinations to which a participation request is sent or so as to allow selection of another group of players as destinations to which a participation request is sent.

Upon accepting the participation requestee input, the server 20 determines whether or not the player who has made the participation request input is the player who has initiated the battle, namely a so-called initiator (S508). This embodiment assumes that an ability-value-nondependent damage-inflicting process to the enemy character is executed only in response to a participation request input made by the initiator. In a game in which a player initiates a battle against an enemy character by consuming predetermined items, players may benefit more from participating in a battle initiated by another player than from initiating a game by themselves because they can participate in a game without consuming items. If this is the case, the number of players who initiate a battle will decrease, leading to a reduction in opportunities for players to enjoy battles. Players are motivated to initiate a battle by themselves if a player who has initiated a battle can inflict damage, such as single-killing-hit damage, on the enemy character by performing a participation request input. Furthermore, this scheme increases the number of battles in which other players can participate, thereby revitalizing the whole game. In another embodiment, the execution of a damage-inflicting process on the enemy character based on a participation request input need not be limited to the initiator.

If it is determined that the player is not the initiator (S508), the flow proceeds to a participation-requested player determination process (S526), and if it is determined that the player is the initiator, it is determined whether or not the specified participation requestees are participation requestees who are eligible for the execution of an ability-value-nondependent damage-inflicting process ("all" here) (S510). The flow proceeds to the participation-requested player determination process (S526) if "all" is not included. It is determined whether or not ability-value-nondependent damage is inflicted on the enemy character (S512) if "all" is included. Although, in this embodiment, the server 20 determines whether or not to inflict damage by a lottery process on the basis of a damage-inflicting probability table stored in the storage unit 45, the embodiment may be configured to inflict damage at all times or to determine whether or not to inflict damage according to a predetermined pattern. In addition, if a lottery process is executed a predetermined number of times and it is not determined that damage is inflicted in the predetermined number of lottery processes, it may be determined that damage is inflicted.

Here, it is determined whether or not to inflict damage on the enemy character by using the damage-inflicting probability table for participation request inputs shown in Table 1. It is assumed that the level of the enemy character is read out from the battle parameters stored in the storage unit 45, a damage-inflicting probability is determined on the basis of the read-out level of the enemy character, and a lottery process for determining whether or not to inflict damage on the basis of the determined damage-inflicting probability is executed by using random numbers. Any process is acceptable as long as the process can determine whether or not to inflict damage at a predetermined probability.

The flow proceeds to the participation-requested player determination process (S526) if it is determined that damage is not inflicted (S514), and a process for determining an ability-value-nondependent damage inflicting character is executed (S516) if it is determined that damage is inflicted. A damage-inflicting character is a presentation character serving as an agent who inflicts damage with a presentation for inflicting the damage on the enemy character displayed on the display unit 32 of the player terminal 10. It is assumed that a damage-inflicting character is one character here, but there may be a plurality of damage-inflicting characters.

Figure 6:
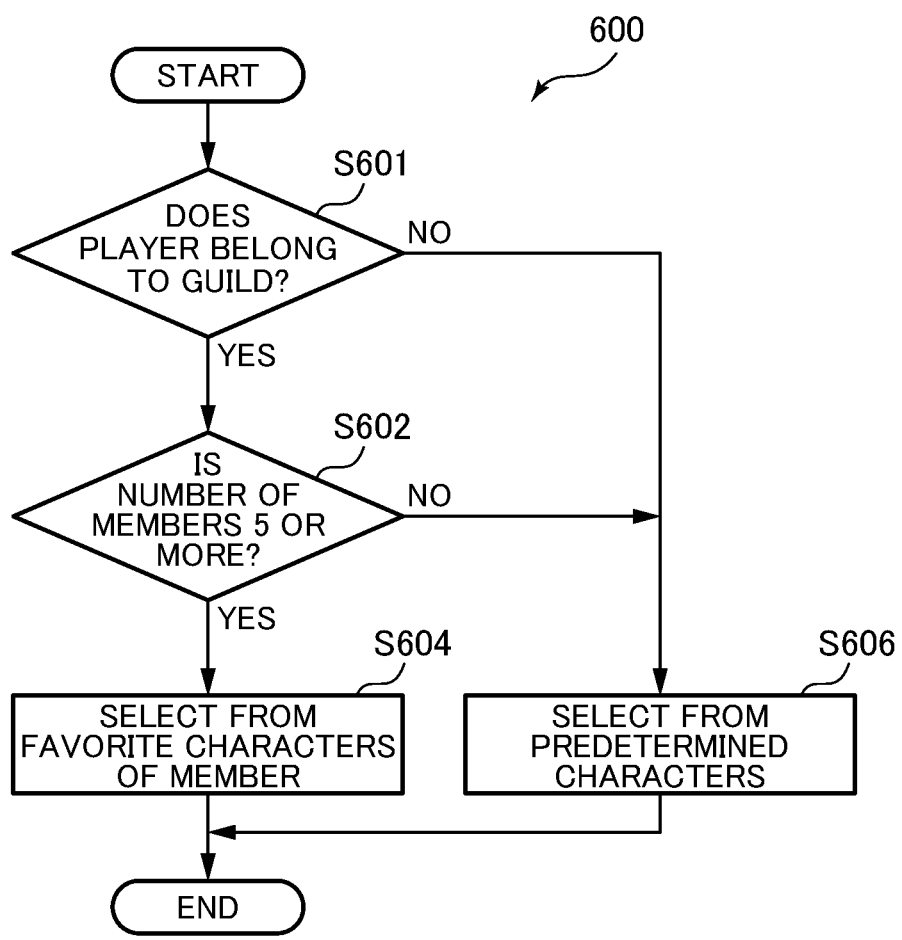
FIG. 6 is a flowchart showing information processing according to one embodiment of the present invention.

FIG. 6 shows a process for determining a damage-inflicting character in this embodiment. A damage-inflicting character is assumed to be randomly selected from characters registered as favorite characters by another player of the guild in which the player who has made the participation request input participates or is assumed to be randomly selected from predetermined characters. It is not necessary to select a damage-inflicting character from characters of players to whom a participation request is sent.

First, it is determined whether or not the player who has made the participation request input belongs to a guild on the basis of a guild ID included in the player parameters of the player (S601). If it is determined that the player belongs to a guild, the number of other players participating in the guild is identified on the basis of the relevant guild ID. Then, it is determined whether the number of players participating in the guild is equal to or larger than a predetermined number of players (five here) (S602). If it is determined that the number is five or more, another player in the guild is determined by a lottery process, and it is determined that a favorite character of the determined other player is a damage-inflicting character.

It is also possible to allow each of the players not to set a favorite character. In this case, it is acceptable that another player be determined by a lottery process from among the players who set favorite characters in the guild. Alternatively, another player can be determined by a lottery process from among all players in the guild, and if the determined player is then found not to set a favorite character, a damage-inflicting character may be determined by a lottery process from predetermined characters. In addition, there can be cases in which none of the other players in the guild set a favorite character. In such a case, it may be determined that a character randomly selected from predetermined characters is a damage-inflicting character. It may be determined that the number of players participating in the guild (S602) is the number of players who have set a favorite character.

On the other hand, if it is determined that the player does not belong to a guild (S601) or it is determined that the number of members in a guild is less than five although the player belongs to the guild (S602), a damage-inflicting character is assumed to be selected by lottery from among a plurality of predetermined characters (S606). In the case where the number of members participating in the guild is small, the members selected by a lottery process are limited, and hence it is highly likely that a favorite character of the same member is selected a plurality of times, which decreases the fun of the game. For this reason, if the number of members in the guild is less than a predetermined number, a damage-inflicting character is assumed to be selected from a plurality of predetermined characters.

Preferably, a character selected from a plurality of predetermined characters should be selected regardless of whether the character is possessed by the player. The player can see a presentation he/she cannot usually see by displaying the presentation of a character selected from characters not possessed by the player. Note that there may be different versions of the same character in which the different versions have different rarities, properties, and other parameters. Here, different versions of the same character are treated as different characters.

After a damage-inflicting character has been determined, an ability-value-nondependent damage-inflicting process on the enemy character is executed (S518). The ability-value-nondependent damage-inflicting process includes processes for determining the magnitude of damage to be inflicted on the enemy character and calculating the remaining HPs of the enemy character on the basis of the determined damage. This embodiment assumes that the damage to be inflicted on the enemy character is single-killing-hit damage, which has a magnitude of damage equal to the remaining HPs of the enemy character, thus setting the remaining HPs in parameters of the enemy character to zero. In the case where there are a plurality of enemy characters, all of the enemy characters are assumed to be defeated with a single killing hit. However, it is also acceptable that only some of the enemy characters are defeated. It is also acceptable to randomly inflict damage the magnitude of which is equal to or larger than the remaining HPs of the enemy character. This gives the player an opportunity to acquire more points in the case where the number of acquired points is calculated according to the magnitude of the inflicted damage.

In the case where the ranking of the participating players is determined according to the number of points that is given in one battle after being calculated according to the magnitude of damage inflicted on the enemy character or the participating players are rewarded according to the ranking, the number of points for determining this ranking may be calculated by excluding ability-value-nondependent inflicting damage.

Next, the server 20 generates presentation screen information on the basis of the determined damage-inflicting character and transmits this presentation screen information to the player terminal 10 (S520), which then displays, on the basis of the presentation screen information, a presentation screen on the display unit 32 (S522).

Figure 9:
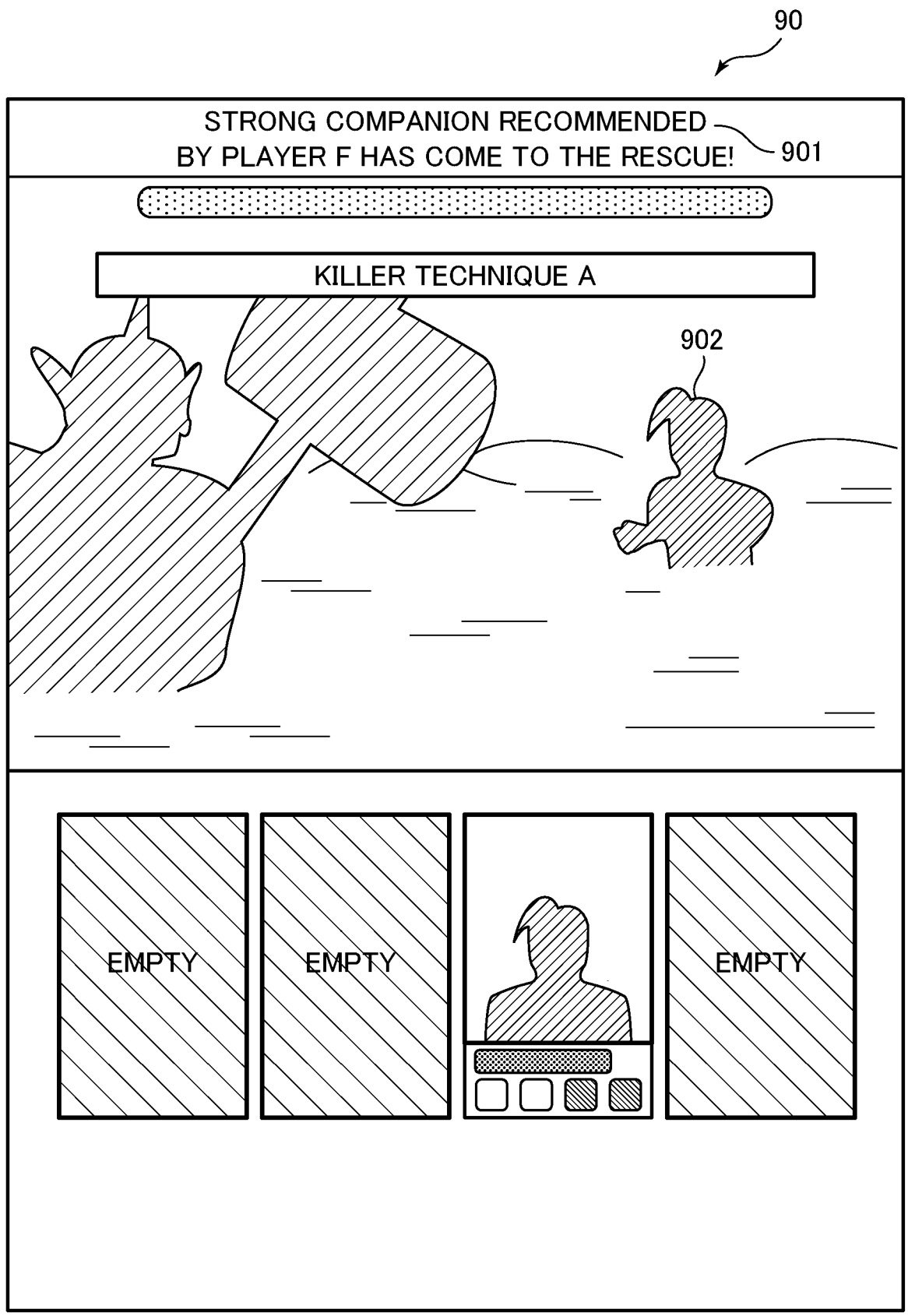
FIG. 9 is an example of a game screen according to one embodiment of the present invention.

FIG. 9 shows an example of the presentation screen. As shown in FIG. 9, the message "Strong companion recommended by player F has come to the rescue!" is displayed (901), and player F's favorite character attacking the enemy character by using killer technique A is presented (902). Preferably, characters of the player who has sent the participation request should not be displayed while this presentation is given.

With a presentation in which a character selected not from the characters of the player who has made a participation request input but from recommended characters of another player of the guild defeats the enemy character as described above, the player can see a presentation of characters not possessed by himself/herself. This enhances the fun of the game. During a presentation, the name of a player, such as the guild member possessing the character who has come to the rescue, should preferably be displayed. A simulated experience that a character of another player in the guild has come to the rescue can enhance the sense of unity with the other player. In addition, the player can feel the pleasure of introducing his/her favorite characters by having the player's own favorite characters appear in a battle of another player.

Such a configuration can be easily realized in a game executed by using a browser in the player terminal 10, as in the game according to this embodiment. More specifically, because the server 20 stores, in the storage unit 45, information for generating presentation image information even for characters not possessed by the player, the server 20 can generate presentation image information on the basis of this information and send the presentation image information to the player terminal 10. In the player terminal 10, it is sufficient that a presentation image is displayed on the basis of the received presentation image information.

In the case where a damage-inflicting character is selected by lottery from among a plurality of predetermined characters (S606), it is possible to make a presentation in which the selected damage-inflicting character performs an attack by using a killer technique together with the message "'character name' has rushed to 'player name'!".

Then, it is determined whether or not the remaining HPs of the enemy character have reached zero due to damage inflicted on the enemy character by the damage-inflicting process (S518) (S524). If the remaining HPs are zero, presentation screen information is generated on the basis of a game result indicating that the enemy character has been defeated (S560).

If it is determined that the remaining HPs are larger than zero, a participation-requested player, who is a player receiving a participation request, is determined on the basis of the participation requestee input made by the player (S526). Because ability-value-nondependent inflicting damage in this embodiment is single-killing-hit damage, the remaining HPs of the enemy character are zero if it is determined that damage is inflicted. In this case, a participation request process for requesting other players to participate in the battle, including determination of a participation-requested player and registration of the participation-requested player, is not executed.

At least one player is determined randomly from among all players if the participation requestee input is "all", at least one player is determined randomly from among the friends of the player who has made the participation request input if the participation requestee input is "friend", and it is determined that all guild members are participation-requested players if the participation requestee input is "guild" (S526). The determined participation-requested players are registered by adding, to the player parameters that belong to the determined participation-requested players and that are stored in the storage unit 45, participation-requested information indicating that the determined participation-requested players are allowed to participate in the relevant battle (S528).

This embodiment assumes that a player who has sent a participation request is provided with a participation request reward. As the participation request reward, a portion, which is an item for recovering the HPs of a player character, is registered in a player parameter of the relevant player (S530). Providing a participation request reward encourages players to send a participation request, thereby making it possible to increase opportunities for other players to participate in the game.

In the case where a participation request is sent to two or more groups, the process for inflicting ability-value-nondependent damage, such as the processing in S512 to S516, may be executed only once, or the number of times the damage-inflicting process is executed may be determined on the basis of the number of groups to which the participation request has been sent. Even in the case where a participation request has been sent to, for example, two groups, the processing in S512 to S516 may be executed only once, the processing in S512 to S518 may be repeated twice, or alternatively, the processing in S512 to S516 may be executed only once, though only the processing for inflicting damage and displaying a presentation in S518 and S520 is executed twice.

It is also acceptable to repeat a participation request input a predetermined time period after the last participation request input, so that the process for inflicting ability-value-nondependent damage can be executed each time a participation request input is made. For example, if a participation request input is made for "all", a participation request process is executed only for some of the players randomly selected from all players. It is possible to increase the number of players to whom a participation request is sent by repeatedly making a participation request input.

Here, one participation request sent to a "guild" can be assumed to cause the participation request to be sent to all players in the guild, so that only one participation request input may be allowed for such a group. In an aspect in which a participation request can be sent only to a "guild" and a participation request input is allowed only once, a button such as a special participation request button, instead of a participation request button, may be displayed a predetermined time period after the execution of the process for inflicting ability-value-nondependent damage by making a participation request input, so that a touch input to the relevant special participation request button can activate a damage-inflicting process. Even in an aspect in which a participation request input cannot be made a second time, it is assumed that a damage-inflicting process is allowed at predetermined time intervals.

When another player registered as a participation-requested player makes access to, for example, the server 20, the game control unit 44 reads out the player parameters for the relevant player from the storage unit 45 and displays, on the player terminal 10, a button for prompting participation in the battle if it is determined that the read-out player parameters include participation-requested information. When the relevant button is touched on the player terminal 10, a request for participation in the battle is input, causing a battle participation process to be executed on the server 20 side and battle screen information to be transmitted from the server 20 to the player terminal 10. A battle screen is displayed on the player terminal 10 that has received the battle screen information. In the flowchart shown in FIG. 4, a participation request input, instead of the above-described battle initiation request, is transmitted from the player terminal 10 (S401), and the server 20 executes a participation start process instead of a battle initiation process (S402). Battle processing for battle participants can be achieved by executing the subsequent processing in the same manner as described above in reference to FIG. 4.

The server 20 generates presentation screen information on the basis of the results of the processing in S526 to S530 (S560). For example, the server 20 generates presentation screen information for displaying information indicating that a participation request has been sent and for displaying information indicating that a portion has been acquired as a participation reward.

If the command input is an attack command input in the command type determination (S501), the process for inflicting ability-value-nondependent damage in S540 to S552 and S522 is executed before the execution of a normal ability-value-dependent damage-inflicting process on the enemy character (S554).

For a damage-inflicting probability table used to determine ability-value-nondependent inflicting damage based on an attack input, the damage-inflicting probability table for attack inputs shown in Table 2 is used. The damage-inflicting probabilities are set so as to increase as elapsed turns are increased. For example, in the case where inflicted damage is single-killing-hit damage, the player, with the help of the single killing hit, becomes more likely to defeat even an enemy whom he/she cannot usually defeat, as long as the player can continue fighting while avoiding total destruction. Even players with insufficient fighting strength can feel the fun of combating against strong enemies by working out a strategy and are hence more encouraged to initiate battles. This increases the number of battles that are generated. In addition, for players having sufficient fighting strength, they will be able to finish, in a shorter time period, battles that would take a certain time period to defeat enemies, thereby encouraging players to initiate a larger number of battles by themselves.

Other processing, except the process for determining whether or not the participation requestee input includes "all" (S510), is the same as the processing in S508 to S524 that is executed in relation to the participation request command and thus will not be described in detail.

If the enemy character cannot be defeated in the ability-value-nondependent damage-inflicting process (S552), a normal ability-value-dependent damage-inflicting process is executed (S554). Ability-value-dependent damage (first damage) inflicted on the enemy character is determined on the basis of the attacking power of the player characters, the defending power of the enemy character, etc. When damage inflicted on the enemy character is determined, the remaining HPs of the enemy character are calculated. Then, it is determined whether or not the remaining HPs of the enemy character are larger than zero (S556). The flow proceeds to a presentation screen information generation process (S560) if the remaining HPs of the enemy character are zero, and a process for inflicting damage on the player characters resulting from an attack carried out by the enemy character is executed (S558) if the remaining HPs of the enemy character are larger than zero. The damage inflicted on the player characters is determined on the basis of the attacking power of the enemy character, the defending power of the player characters, etc. If it is determined that the HPs of the enemy character are zero, the damage-inflicted process is skipped.

Figure 10:
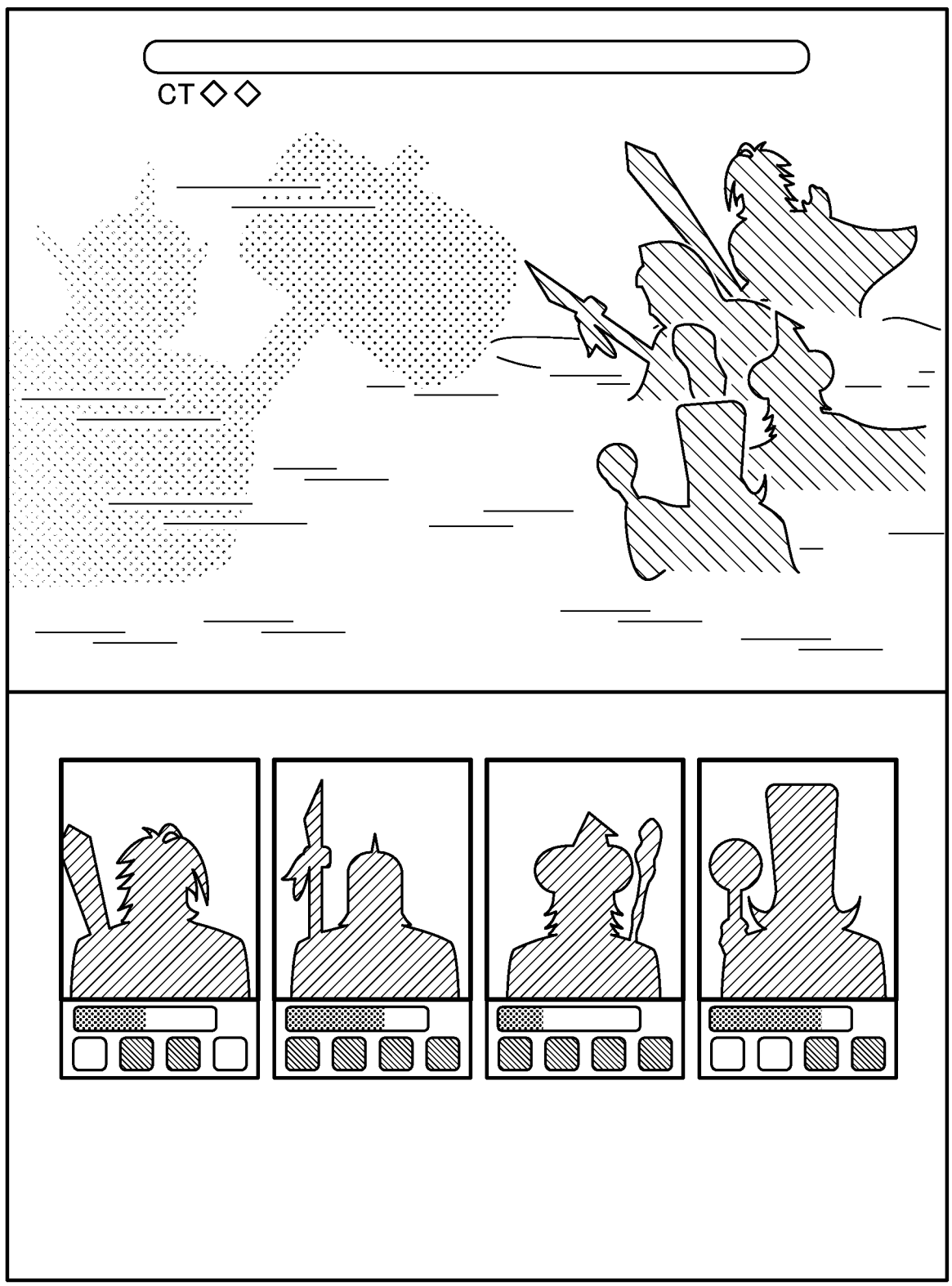
FIG. 10 is an example of a game screen according to one embodiment of the present invention.

The server 20 generates presentation screen information on the basis of the results of the ability-value-dependent damage-inflicting process (S554) and the damage-inflicted process (S558) (S560). For example, the server 20 generates information for displaying a screen on which attacks carried out by the player characters and the enemy character are presented. The generated presentation image information is transmitted to the player terminal 10 in S416 in FIG. 4 and is displayed on the display unit 32 of the player terminal 10. For example, if the HPs of the enemy are zero in the damage-inflicting process (S516), a presentation image illustrating that the enemy character is defeated is displayed as shown in FIG. 10. The players' own characters, which were hidden while the presentation image as shown in FIG. 9 is being displayed as a result of the damage-inflicting process being executed, may be displayed again.

It is possible to motivate a player to positively send a participation request by enhancing the status of the player as a reward for sending a participation request. This is because the player can proceed with the battle advantageously with an enhanced status, which possibly increases the number of players participating in the battle, thereby making the player more likely to win the battle.

On the other hand, if the fighting strength of the player is low, there is risk that the player cannot win the battle merely by enhancing his/her status. Moreover, even if the player sends a participation request, it is not guaranteed that another player participates in the battle, and furthermore, it is not guaranteed that another player, even if participating in the battle, immediately participates in the battle. As a result, the player may have difficulty winning the battle and be discouraged from initiating a battle. This might cause a decrease in the number of battles and the number of participation requests in the game, possibly leading to a decrease in the opportunities to participate in multi-battles in the game as a whole and to a decrease in the time spent by the player on playing the game.

With this embodiment, the player can increase the possibility of defeating the enemy character by means of second damage, such as ability-value-nondependent inflicting damage. In particular, by setting the second damage to single-killing-hit damage, i.e., damage having a magnitude equal to or larger than the remaining HPs of the enemy character, even players with insufficient fighting strength can be more encouraged to initiate a battle against a tough enemy character. Also, players having sufficient fighting strength take only a shorter time period to defeat the enemy character and are thus allowed to initiate a larger number of battles.

There are games in which the fighting strength of players can be enhanced by collecting a plurality of weapons and items that are acquired at a certain probability when the enemy character is defeated. In such games, it is scheduled that a player repeatedly fights a battle against the same enemy character many times in order to acquire a weapon, etc. Reducing the time required to defeat the enemy character is advantageous to players because players can acquire a larger number of items, etc. in a fixed time period.

If the fighting strength of a player is not sufficient, the player cannot defeat the enemy character in the first place and thus cannot acquire items, etc. In the case where players are rewarded in order of the amount of damage inflicted on the enemy character, even if a player can defeat the enemy character as a result of other players with sufficient fighting strength participating in the battle, the other players with sufficient fighting strength are rewarded, thus disabling a player with insufficient fighting strength from acquiring a sufficient number of items, etc. that help enhance the fighting strength. This results in further widening of the gap in fighting strength between players with low fighting strength and players with high fighting strength. The use of this embodiment allows even players with low fighting strength to defeat the enemy character with a certain probability, thus giving such players a chance of acquiring items. This helps even beginners who have only just experienced the game positively initiate a battle and encourages players to continue playing the game.

The use of this embodiment encourages players to play the game and thus not only increases the number of battles in the game system as a whole but also increases the number of participation requests. As a result, the number of battles that can be played by players is increased even in the case where the player himself/herself does not initiate battles, making it possible to revitalize the game as a whole.

The processing or operation described above may be modified freely as long as no inconsistency arises in the processing or operation, such as an inconsistency that a certain step utilizes data that may not yet be available in that step. Furthermore, the examples described above are examples for explaining the present invention, and the present invention is not limited to those examples. The present invention can be embodied in various forms as long as there is no departure from the gist thereof.

REFERENCE SIGNS LIST

1 Game system
2 Network
10 Player terminal
11 Processor
12 Display device
13 Input device
14 Storage device
15 Communication device
16 Bus
20 Server
21 Processor
22 Display device
23 Input device
24 Storage device
25 Communication device
26 Bus
31 Input unit
32 Display unit
33 Communication unit
34 Game control unit
35 Storage unit
41 Input unit
42 Display unit
43 Communication unit
44 Game control unit
45 Storage unit
541 Participation request button
721 Attack button
741 Participation request button
810 Participation request button

The invention claimed is:

1. A non-transitory computer readable medium storing a program for a game including a multi-battle in which a plurality of players combat against a common enemy character, said program causing a computer to execute a method comprising:
   a step of accepting a multi-battle initiation input from a player;
   a step of initiating a multi-battle for combating against a predetermined enemy character based on the accepted multi-battle initiation input;
   a step of accepting a participation request input from the player, said participation request input requesting another player to participate in the initiated multi-battle; and a step of executing a process for inflicting damage on the predetermined enemy character upon accepting the participation request input, wherein the step of executing the process for inflicting damage on the predetermined enemy character comprises:
 a step of executing a lottery process for determining whether or not to inflict damage on the predetermined enemy character, and
 a step of inflicting damage on the predetermined enemy character in response to determining that the damage is inflicted on the predetermined enemy character as a result of the lottery process.

2. The non-transitory computer readable medium according to claim 1,
wherein, in the game, a player possesses at least one character and combats against the predetermined enemy character by using the possessed character, and
the step of executing a process for inflicting damage includes a step of displaying a presentation for rendering the infliction of damage on the predetermined enemy character by means of a presentation character selected from among predetermined characters, regardless of whether or not the presentation character is possessed by the player.

3. The non-transitory computer readable medium according to claim 1,
wherein the step of executing a process for inflicting damage includes a step of selecting a presentation character from among a plurality of characters selected in advance by another player.

4. The non-transitory computer readable medium according to claim 1,
wherein, in the lottery process, a probability for determining that damage is inflicted on the predetermined enemy character is determined based on a parameter assigned to the predetermined enemy character.

5. The non-transitory computer readable medium according to claim 1,
wherein the damage has a value equal to or larger than a plurality of remaining hit points of the predetermined enemy character, and the process for requesting another player to participate in the multi-battle is not executed based on the participation request input.

6. The non-transitory computer readable medium according to claim 1,
wherein the damage has a value smaller than a plurality of remaining hit points of the predetermined enemy character, and the process for requesting another player to participate in the multi-battle is executed based on the participation request input.

7. A method performed by a computer for a game including a multi-battle in which a plurality of players combat against a common enemy character, said method comprising:
 a step of accepting a multi-battle initiation input from a player;
 a step of initiating a multi-battle for combating against a predetermined enemy character based on the accepted multi-battle initiation input;
 a step of accepting a participation request input from the player, said participation request input requesting another player to participate in the initiated multi-battle; and
 a step of executing a process for inflicting damage on the predetermined enemy character upon accepting the participation request input, wherein the step of executing the process for inflicting damage on the predetermined enemy character comprises:
 a step of executing a lottery process for determining whether or not to inflict damage on the predetermined enemy character, and
 a step of inflicting damage on the predetermined enemy character in response to determining that the damage is inflicted on the predetermined enemy character as a result of the lottery process.

8. An electronic device for a game including a multi-battle in which a plurality of players combat against a common enemy character, said electronic device comprising:
 a functional unit for accepting a multi-battle initiation input from a player;
 a functional unit for initiating a multi-battle for combating against a predetermined enemy character based on the accepted multi-battle initiation input;
 a functional unit for accepting a participation request input from the player, said participation request input requesting another player to participate in the initiated multi-battle; and
 a functional unit for executing a process for inflicting damage on the predetermined enemy character upon accepting the participation request input, wherein executing the process for inflicting damage on the predetermined enemy character comprises:
 executing a lottery process for determining whether or not to inflict damage on the predetermined enemy character, and
 inflicting damage on the predetermined enemy character in response to determining that the damage is inflicted on the predetermined enemy character as a result of the lottery process.

9. A system for a game including a multi-battle in which a plurality of players combat against a common enemy character, said system comprising:
 a server; and a player terminal of each of the plurality of players that is connected to the server, wherein the server is configured to perform a first method comprising:
 accepts a multi-battle initiation input that is made by a player and that is transmitted from a player terminal,
 initiates a multi-battle for combating against a predetermined enemy character based on the accepted multi-battle initiation input,
 accepts a participation request input that is made by the player and that is transmitted from the player terminal, said participation request input requesting another player to participate in the initiated multi-battle,
 executes a process for inflicting damage on the predetermined enemy character upon accepting the participation request input, and
 transmits, to the player terminal, presentation information for a presentation that renders the infliction of damage on the predetermined enemy character, and
 wherein the player terminal is configured to perform a second method comprising:
 accepts the multi-battle initiation input and the participation request input made by the player and transmits the multi-battle initiation input and the participation request input to the server and
 displays a presentation based on the presentation information from the server,
 wherein executing the process for inflicting damage on the predetermined enemy character comprises:

executing a lottery process for determining whether or not to inflict damage on the predetermined enemy character, and inflicting damage on the predetermined enemy character in response to determining that the damage is inflicted on the predetermined enemy character as a result of the lottery process.

\* \* \* \* \*